(12) United States Patent
Luschi (10) Patent No.: US 11,492,031 B2
(45) Date of Patent: Nov. 8, 2022

(54) MOTORIZED TRANSPALLET

(71) Applicant: PR INDUSTRIAL S.R.L., Casole d'Elsa (IT)

(72) Inventor: Alessio Luschi, Poggibonsi (IT)

(73) Assignee: PR INDUSTRIAL S.R.L., Casole d'Elsa (IT)

( * ) Notice: Subject to any disclaimer, the term of this patent is extended or adjusted under 35 U.S.C. 154(b) by 421 days.

(21) Appl. No.: 16/642,719

(22) PCT Filed: Aug. 27, 2018

(86) PCT No.: PCT/IB2018/056476
§ 371 (c)(1),
(2) Date: Feb. 27, 2020

(87) PCT Pub. No.: WO2019/043548
PCT Pub. Date: Mar. 7, 2019

(65) Prior Publication Data
US 2020/0262462 A1 Aug. 20, 2020

(30) Foreign Application Priority Data
Aug. 28, 2017 (IT) .......... 102017000096416

(51) Int. Cl.
*B62B 5/04* (2006.01)
*B62B 3/06* (2006.01)
*B62B 5/00* (2006.01)

(52) U.S. Cl.
CPC .......... *B62B 5/0404* (2013.01); *B62B 3/0606* (2013.01); *B62B 5/0046* (2013.01); *B62B 5/0069* (2013.01)

(58) Field of Classification Search
CPC ..... B62B 3/0606; B62B 3/0612; H02J 7/0031
See application file for complete search history.

(56) References Cited

U.S. PATENT DOCUMENTS 4,724,332 A * 2/1988 Finger .................. H02J 7/0031
361/194
5,345,163 A * 9/1994 Gibbons ............ G01R 31/3835
340/636.15
(Continued)

FOREIGN PATENT DOCUMENTS

DE 102008012626 A1 * 9/2009 .......... B62B 3/0606
DE 102013103200 A1 * 10/2014 ............... B60K 1/04
(Continued)

OTHER PUBLICATIONS

International Search Report and Written Opinion for International Patent Application No. PCT/IB2018/056476, dated Dec. 11, 2018. 11 pages.

*Primary Examiner* — Steve Clemmons
(74) *Attorney, Agent, or Firm* — Armstrong Teasdale LLP (57) ABSTRACT

A transpallet is provided for ground handling of goods stored on a support platform, comprising at least one motorized wheel, an electromechanical parking braking system of the wheel adapted to take on a stop configuration when not energized and a release configuration when energized and an electric power supply assembly adapted to supply electric power to the motorized wheel and to the electromechanical parking braking system. An on-board electronic control unit is arranged for the selective handling of the transpallet movement in a motorized mode of movement, a manual mode of movement or a stop mode, depending on the charge level of the electric power supply assembly.

10 Claims, 8 Drawing Sheets

(56) References Cited

U.S. PATENT DOCUMENTS

| | | | | |
|---|---|---|---|---|
| 5,670,861 A | * | 9/1997 | Nor | H02J 7/0031 |
| | | | | 340/636.15 |
| 7,025,157 B2 | * | 4/2006 | Lindsay | B62B 3/0612 |
| | | | | 180/332 |
| 9,908,549 B2 | * | 3/2018 | Newell | B62B 3/001 |
| 10,023,043 B2 | * | 7/2018 | Johnson | B62B 5/005 |
| 11,214,471 B2 | * | 1/2022 | Rusche | B62B 5/04 |
| 2014/0291594 A1 | * | 10/2014 | Newell | B62B 5/0033 |
| | | | | 254/2 R |
| 2017/0001656 A1 | | 1/2017 | Katayama | |

FOREIGN PATENT DOCUMENTS

| | | | | |
|---|---|---|---|---|
| EP | 1655211 A2 | | 5/2006 | |
| GB | 651476 A | | 4/1951 | |
| GB | 2190063 A | * | 11/1987 | B62B 3/0606 |
| WO | 2011104656 A1 | | 9/2011 | |
| WO | 2016114987 A1 | | 7/2016 | |
| WO | WO-2018104773 A1 | * | 6/2018 | |
| WO | WO-2018118856 A2 | * | 6/2018 | B62B 1/10 |
| WO | WO-2018126298 A1 | * | 7/2018 | |

* cited by examiner

MOTORIZED TRANSPALLET

CROSS-REFERENCE TO RELATED APPLICATIONS

This application is a National Phase filing of PCT International Application No. PCT/IB2018/056476, having an International Filing Date of Aug. 27, 2018, claiming the benefit of priority to Italian Patent Application No. 102017000096416, having a filing date of Aug. 28, 2017 each of which is hereby incorporated by reference in its entirety.

FIELD OF THE INVENTION

The present invention relates to lift trucks commonly known as transpallets, and more specifically to a transpallet having the features described below.

BACKGROUND OF THE INVENTION

Transpallets are widely used, not only in industry but also in trade, for gripping, handling, and depositing on the ground goods stored on a support platform or pallet, generally made of wood, whose surface for supporting goods is raised from the ground by supports which define corresponding slots for the introduction of lifting arms.

A traditional transpallet comprises a frame provided with a pair of parallel arms or front grip and lift forks, adapted to be introduced into the slots formed at the base of a platform. The raising of the frame, by a limited stroke sufficient to lift the platform from the ground, takes place by means of a hydraulic or pneumatic drive unit. The frame is mounted on a pivoting wheel or a pair of wheels and the arms are supported at the ends by a respective pair of load rollers, so that the transpallet can be translated by pushing or dragging by an operator, which uses a driving tiller for directional maneuvers and raising or lowering controls. The pivoting wheels are mounted idly on a wheel axis symmetrically with respect to a vertical symmetry plane of the drive unit and the wheel axis is rigidly coupled to a steering axis driven in rotation by the driving tiller. The driving tiller, the wheels and the drive unit form the transpallet control assembly.

More specifically, the drive unit, traditionally a hydraulic unit, allows the frame to be raised a few centimeters from the ground or support surface by a hydraulic pumping jack or cylinder which, by an operator's action on the tiller, draws a motor fluid (generally, oil) from a reservoir and pushes it into a main hydraulic chamber by urging a fork-lifting control rod. By means of a thrusting mechanism, a pair of struts housed longitudinally within each fork, urged by a rocker member controlled by the action of the hydraulic assembly, causes the forks to be raised by acting on respective pivotal supports (shoes) which carry the load rollers.

On the driving tiller a three-position lever allows selecting, in addition to the pumping mode for lifting the frame and detaching the platform from the ground, also an idle position, whereby operating the tiller does not raise the forks and it is possible to freely control the translation of the load in the premises in which it must be located, and a descent position of the frame for laying on the ground the transported load.

Although a transpallet of the type described above is typically translated (pushed or dragged) manually by the operator along short distances, mechanical aid in moving the transpallet would not only relieve the operator, but also let him increase his concentration in driving operations as well as in the operations of gripping and depositing goods.

It is also preferable that said mechanical aid does not entail extensive and radical redesign of the transpallet structure, substantial increase in its weight or dimensions, or higher cost.

SUMMARY OF THE INVENTION

The present invention therefore aims to provide a satisfactory solution to the problems described above, while avoiding the drawbacks of prior art.

According to the present invention, this object is achieved by a transpallet having the features described below. Particular embodiments are described as well.

In summary, the present invention is based on the principle of enhancing the structure of a manual transpallet with an accessory motorization.

This is achieved by modifying the manual control assembly, which comprises at least one and preferably a pair of wheels, the drive unit to which the driving tiller is connected, which is actuated by the operator for lifting and lowering the frame, for the manual movement of the transpallet and for the rotation of the steering axis of the wheels, so as to provide a motorized control assembly, which is advantageously connected to the frame of the transpallet at the same attachment points of a manual transpallet structure, thus keeping the frame lifting and lowering modes substantially unchanged.

The implementation of the motorized control assembly specifically includes:

the provision of a motorized wheel or a pair of wheels as drive wheels in place of the idle wheel or pair of wheels, preferably mounted with respect to the steering axis in the same position as the idle wheels present in a manual transpallet structure;

the provision, on the axis of a wheel or of the wheels, of an electromechanical parking braking system designed to block the rotation of the wheel axis or of the wheel(s), for example adapted to take on a stop configuration when they are not energized and a release configuration when they are energized;

the provision of an independent electric power supply assembly, such as a power supply battery or similar accumulator assembly adapted to supply electric power to the motorized wheel or pair of wheels;

the provision of an on-board electronic control unit to manage the movement of the transpallet in the motorized (electric) and manual modes; and the provision of a control interface, adapted to provide control indications of the movement of the transpallet in the motorized (electric) and manual modes.

In a preferred embodiment, the drive wheels include each a synchronous electric motor and a gearbox housed within the wheel volume.

In a preferred embodiment, the independent power supply assembly, such as a supply battery, the on-board electronic control unit and the control interface are mounted on the driving tiller.

In a preferred embodiment, the electronic control unit manages the drive of the drive wheel(s) on the basis of first input signals representative of an operator's controls imparted by the interface and second input signals representative of operating conditions of the transpallet emitted by dedicated control sensors. In the two-wheel drive configuration, the electronic control unit conveniently manages the actuation thereof independently of one another.

In a preferred embodiment, the control interface is positioned on the driving tiller and comprise: a control for starting the transpallet, for the electrical connection of the electric supply assembly with a control system of the drive wheels, for example in the form of a key or a switching button, a control for selecting the movement mode, such as for example a control for excluding the power supply, for example the same key or the same switching button; an accelerator device such as a hall effect accelerator or the like (in the form of a lever, pedal or knob, to cite some examples) adapted to detect an acceleration command by interpreting the position of the accelerator device in a local reference system and transfer said control to the drive wheel control system; one or more sensors for detecting and quantifying the inclination of the driving tiller with respect to a predetermined reference direction, such as the ground, for example one or more accelerometric sensors, one or more end-of-stroke sensors, encoders or the like; an emergency stop system, such as a button or a sensor for recognizing an anomalous posture of the operator, adapted to carry out a so-called "belly button" function; and a display system, such as a screen or a plurality of lights or LEDs, comprising at least one battery charge status indicator and a transpallet operation indicator.

The hydraulic or pneumatic drive unit, typically a hydraulic pump unit, may be the same as in a manual transpallet, integral with the wheel axis adapted for mounting the motorized pair of wheels. Similarly to the prior art of a manual transpallet, the driving tiller is connected to the drive unit to selectively select, in a respective operating position, the raising or lowering of the frame, and is arranged to take on an idle position, whereby it allows an operator to freely control the orientation of the steering axis for driving the transpallet (the steering control may also take place simultaneously with a load lifting or lowering operation).

It is clear from the foregoing that a motorized transpallet according to the invention can be implemented by at least partial replacement of the components of the control unit of a manual transpallet. This allows a manual transpallet to be converted into a motorized transpallet by replacing the control unit (hydraulic unit and tiller), keeping the frame and the rocker arm assembly, struts and rollers unaltered.

The on-board electronic control unit for managing the movement of the transpallet in the motorized and manual modes operates as described below.

There are three operating modes of the transpallet of the invention, respectively a motorized (electric) movement mode, a manual movement mode and a stop or parking mode.

In the motorized (electric) movement mode, selected after starting the transpallet by switching a starting key to the ON position, following a control by the operator given by the inclination of the driving tiller (typically, an inclination towards himself starting from a vertically aligned rest position), the electronic control unit energizes the electromechanical parking braking system so as to switch them from a wheel stop configuration to a release configuration. Then, following the actuation of the accelerator device, the electronic control unit actuates the electric motors of the wheels at a rotation speed corresponding to a desired translation speed of the transpallet, adjusted according to the position taken by the accelerator device in the local reference system.

The angular position of the driving tiller, which rotates in its symmetry plane around the connection axis with the hydraulic pump, detected with respect to the vertical plane by the one or more sensors for the detection and quantification of the inclination of the driving tiller with respect to a predetermined reference direction, processed by the electronic control unit, gives consent to the drive. According to a currently preferred embodiment, when the driving tiller is in the rest position or within a predetermined angle, for example an angle between said position and a predetermined operating threshold angle, preferably 10°, the electromechanical parking braking system is not energized whereby it is in the wheel stop configuration, and the electric drive is disabled. Beyond the 10° rotation of the driving tiller with respect to the rest position, the electronic control unit energizes the parking braking system—which switches from the stop configuration to the release configuration, thus enabling the transpallet to move. Then, following a control to the accelerator device, the electric drive is activated. Conveniently, the electric drive is disabled within a predetermined angular interval before the end of the driving tiller travel, for example from an angle of 10° before the end of travel to the end of stroke position. Simultaneously with the occurrence of this condition, the energization of the parking braking system is interrupted to switch it from the release configuration to the stop configuration.

Advantageously, upon the release of the accelerator device, a countercurrent electric braking is anyway carried out until the transpallet stops, when the parking braking system is controlled to switch from the release configuration to the stop configuration.

The translation speed of the transpallet is adjusted by the accelerator device mounted on the driving tiller similarly to similar machines.

The transpallet steering control may be imparted manually by the operator, who directs the transpallet by rotating the driving tiller, or it may be managed autonomously and in electrical mode by the electronic control unit by controlling the rotation of the two drive wheels at speeds different from each other, for example, depending on the actuation of a joystick by the operator, where the joystick is arranged to detect a first rotation around a first axis in order to adjust the speed and to detect a second—possibly simultaneous—rotation around a second axis in order to adjust the direction (radius or steering time), acting directly on the wheels.

The two steering modes may be implemented alternately with each other or jointly with each other.

In the manual movement mode, taken by means of a corresponding selector element, the electronic control unit, following the selection of the operating mode by the operator, energizes the electromechanical parking braking system so as to switch it from a wheel stop configuration to a release configuration, so that the wheels are free to rotate about their axis. The angular position of the driving tiller is not processed by the electronic control unit for the purpose of managing the movement of the transpallet, allowing the manual movement of the transpallet independently of the angular position in which the driving tiller is located.

Braking is made possible by a manual braking function, which can be activated by the electric power exclusion control, which causes the interruption of the energization of the parking braking system and the consequent switching from the release configuration to the stop configuration.

In the stop or parking mode, the electronic control unit is deactivated, with the consequent locking of the parking brakes that must be energized in order to be released.

Advantageously, the motorized (electric) movement mode can be used up to a predetermined first threshold level of the battery charge, below which the residual charge is used for the actuation of the braking system and therefore for the manual movement mode.

When a second battery charge threshold level is reached, substantially corresponding to the low battery condition, the transpallet automatically enters the stop mode (the parking brakes are locked) whereby a charging of the electric supply assembly or their replacement is required.

Further features and advantages of the present invention will appear more clearly from the following detailed description of an embodiment thereof, given by way of non-limiting example with reference to the accompanying drawing.

DETAILED DESCRIPTION

Figure 1:
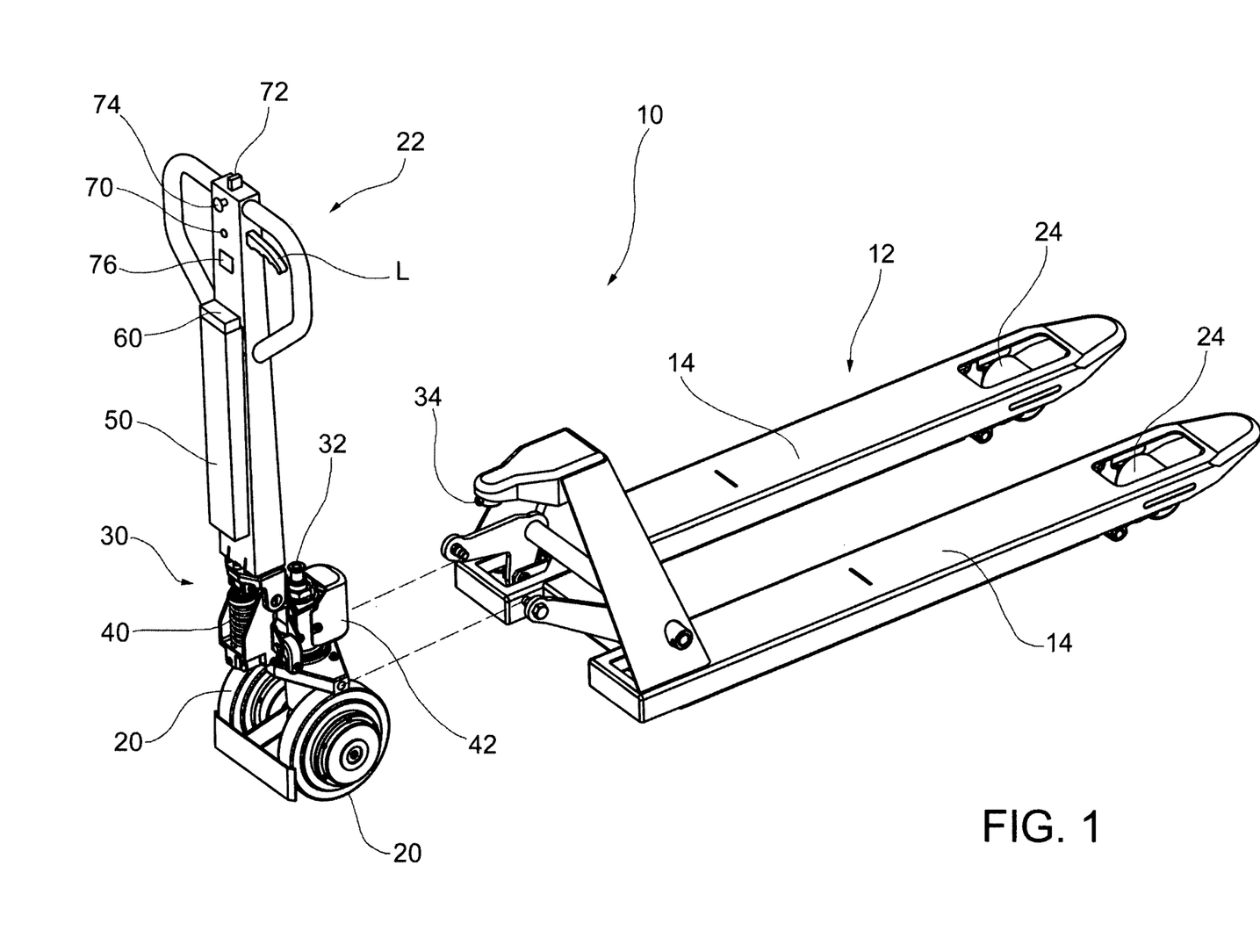
FIG. 1 is a schematic, partially exploded view of a transpallet according to the present invention.

The structure and operation of a transpallet according to the present invention are similar to that of a conventional transpallet and are briefly referred to below with reference to FIG. 1, which shows a partially exploded view of the transpallet.

A frame for supporting a platform (pallet) for the temporary storage of goods is indicated as a whole with reference numeral 10. It comprises a base support structure 12, of limited vertical extension, and is provided with a pair of front parallel arms or forks 14 adapted to be introduced at the base of the platform, for the lifting thereof.

The frame is supported, at the base support structure 12, by a motorized wheel or pair of wheels 20, rotatable about a vertical axis, acting as drive wheels and adapted to allow driving the transpallet by a driving tiller 22. In a preferred embodiment, the motorized wheels preferably have the same dimensions as the idle wheels of a manual transpallet and retain the function of supporting the weight of the transpallet, while also performing the function of moving the transpallet by rotation thereof. They include each a synchronous electric motor and a gearbox housed within the wheel volume. The rubber (or plastic) tread ring is preferably vulcanized directly on the outer disk of the motorized wheel and is rotated by said internal reduction gear.

On the opposite side, the free end of the arms 14 is supported by a pair of load rollers 24, mounted on articulation supports which allow the dislocation thereof in relation to the raising or lowering condition of the frame with respect to the ground.

A hydraulic unit 30, in axis with the wheels 20, is connected to the frame by a rocker arm hinged to a cross support and allows raising/lowering the frame by the action of a lifting rod 32 whose head is engaged in a seat formed on an abutment 34 of the frame, and whose movement is determined by a control fluid (generally oil) under pressure operated by a single effect pumping jack or cylinder 40 which, controlled by the driving tiller 22 through a control member, actuates the suction of the fluid from a reservoir 42 and pushes it into a main pressure chamber of a sliding cylinder. Through the rocker arm, which follows the raising of the frame, a pair of struts, articulated to the rocker arm and pushed thereby, raises the arms acting on the articulation supports which carry the load rollers 24.

An operating lever L on the tiller 22 allows selecting, in addition to the pumping mode for lifting the frame, also an idle position suitable for the translation of the load, and a descent position of the frame.

On the driving tiller 22, and preferably in a position behind the frame and facing towards an operator, for example in a housing formed inside the tiller or outside it, an accumulator assembly 50 such as an independent power supply battery is arranged, whose terminals are connected, through cabling extending along the driving tiller 22, to the electric motors of the wheels and to the associated parking braking system (and possibly also to the hydraulic or pneumatic drive unit), as well as to the other electrical or electronic components mentioned above.

The driving tiller 22 is also associated to an on-board electronic control unit 60 for managing the movement of the transpallet in the motorized and manual mode, preferably installed in a dedicated housing which is shown in the figure near the power supply battery, and connected to said battery for its own power supply. The control unit may be divided into two distinct modules, one that manages the operating logic and the interface with the operator (placed on the tiller) and the other that manages the driving of the motors (placed near the latter).

On the driving tiller 22, or on a support associated thereto, a transpallet control interface is arranged, which comprise a starting key 70 or similar starting devices for the transpallet, optionally integrated with a device for selection of the movement mode (motorized, manual, stop), an accelerator device 72 (shown in the form of a button, but which may be implemented differently according to known techniques, for example in the form of a lever) adapted to transfer a movement control (typically with variable speed from 0 to a predetermined maximum value) or an acceleration control to the respective electric motors of the wheels, a reversing button (emergency button) 74 and a visual indicator consisting of a screen or a series of LEDs 76 comprising at least one status indicator, for example a battery charge indicator and an indicator of the operation status of the transpallet.

The operation of a motorized transpallet of the type described above is illustrated in the following description.

Figure 2A:
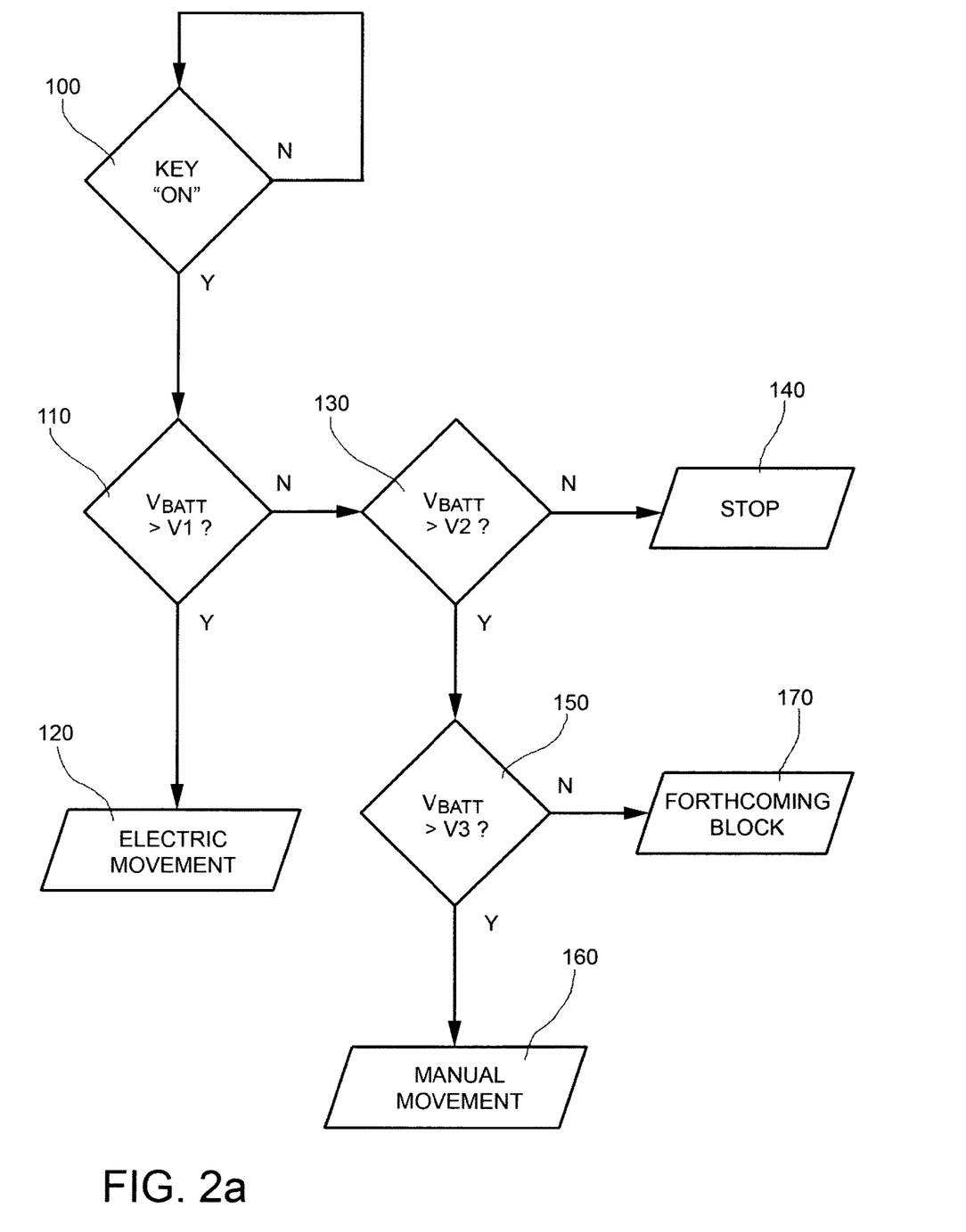
FIGS. 2a and 2b are flowcharts representative of the starting modes of the transpallet according to the present invention.

FIG. 2a is a flowchart representative of a first embodiment of the transpallet starting modes.

Starting from a condition of transpallet at rest (not active), which is maintained until a start command is given, it is verified (intrinsically with the power on of the system, as a consequence of the power supply of the electronic control unit) at step 100 whether the starting key 70 switches to an activation condition of the transpallet, in the affirmative, the on board electronic control unit 60 awakens and the process switches to the next step 110, in which the electronic control unit checks whether the charge level of the battery $V_{BATT}$ is higher than a first predetermined threshold level V1. In the affirmative, the transpallet enters the motorized (electric) movement mode (step 120), in the negative, the electronic control unit checks at step 130 whether the battery charge level is higher than a second predetermined threshold level V2, lower than the first threshold level V1. In the negative, the transpallet enters the stop mode at step 140 while, in the affirmative, the electronic control unit checks at step 150 whether the battery charge level is higher than a third predetermined threshold level V3, intermediate between the first and second threshold level. In the affirmative, the transpallet enters the manual movement mode at step 160, while in the negative, the transpallet enters the manual movement mode with forthcoming block signal at step 170, i.e., the transpallet stops within a predetermined time interval.

Figure 2B:
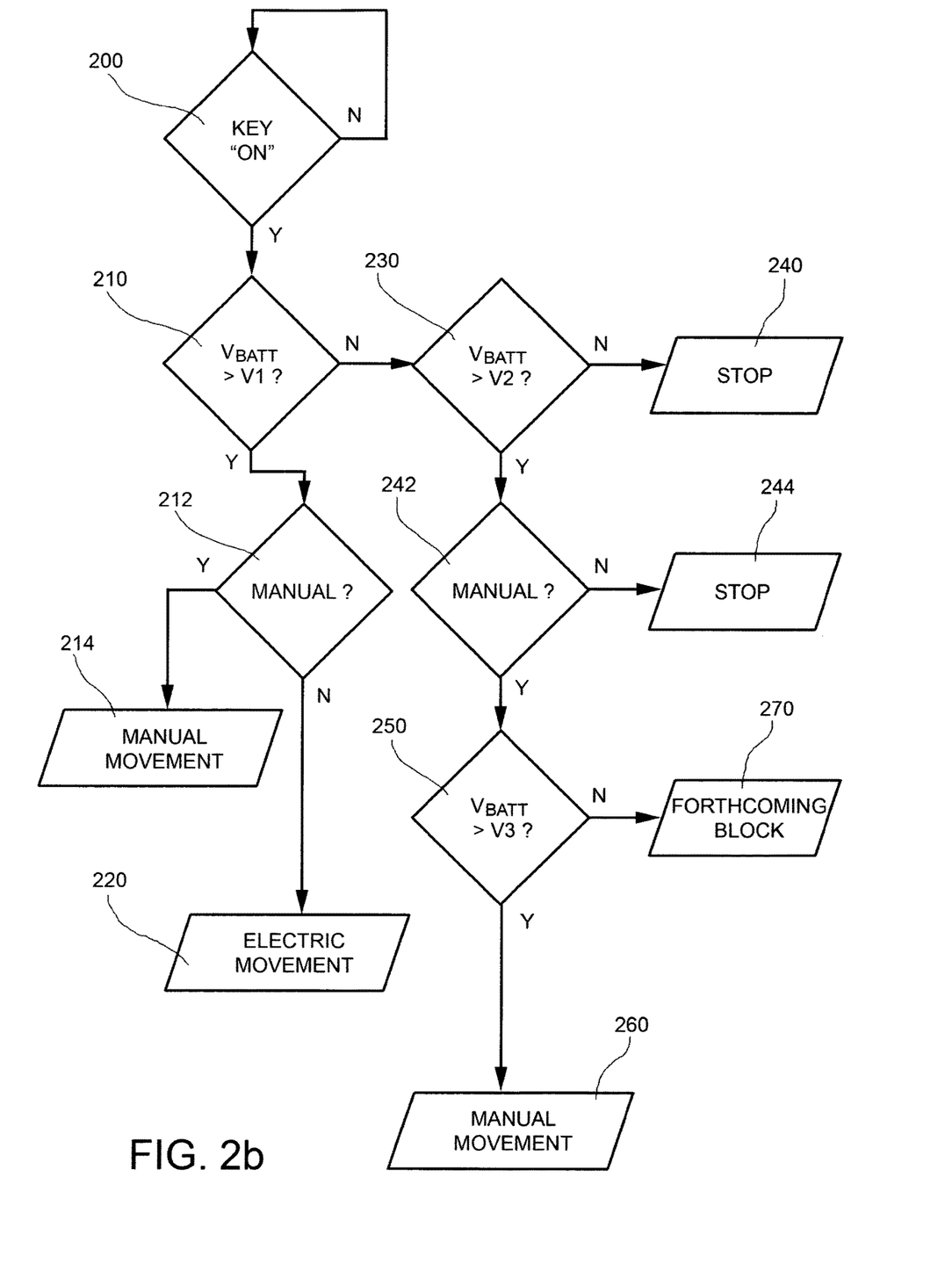

FIG. 2b is a flowchart representative of a second embodiment of the transpallet starting modes, wherein the interface also includes a switching device for voluntarily selecting a manual movement mode, e.g., electric power exclusion control, such as the same key or the same switching button.

Starting from a condition of transpallet at rest (not active), which is maintained until a start command is given, it is verified at step 200 whether the starting key 70 switches to an activation condition of the transpallet, in the affirmative, the on board electronic control unit 60 awakens and the process switches to the next step 210, in which the electronic control unit checks whether the charge level of the battery is higher than a first predetermined threshold level V1. In the affirmative, the electronic control unit verifies at step 212 whether a switching control is given to the manual movement mode by electric power supply exclusion control, for example by pressing a dedicated pushbutton or switching the same starting key 70. In the affirmative, the transpallet enters the manual movement mode at step 214. In the negative, the transpallet enters the motorized (electric) movement mode (step 220). In the event that the battery charge level is lower than the first predetermined threshold level V1, the electronic control unit checks in step 230 whether the battery charge level is higher than a second predetermined threshold level V2, lower than the first threshold level V1. In the negative, the transpallet enters the stop mode at step 240 while in the affirmative, the electronic control unit verifies at step 242 whether a switching control is given to the manual movement mode by electric power supply exclusion control, for example by pressing a dedicated pushbutton or switching the same starting key 70. In the negative, the transpallet enters the stop mode at step 244, while in the affirmative, the electronic control unit checks at step 250 whether the battery charge level is higher than a third predetermined threshold level V3, intermediate between the first and second threshold level. In the affirmative, the transpallet enters the manual movement mode at step 260, while in the negative, the transpallet enters the manual movement mode with forthcoming block signal at step 270, i.e., the transpallet stops within a predetermined time interval.

With reference to FIGS. 3a-3g, some embodiments of the transpallet in the motorized (electric) movement mode are shown.

Figure 3A:
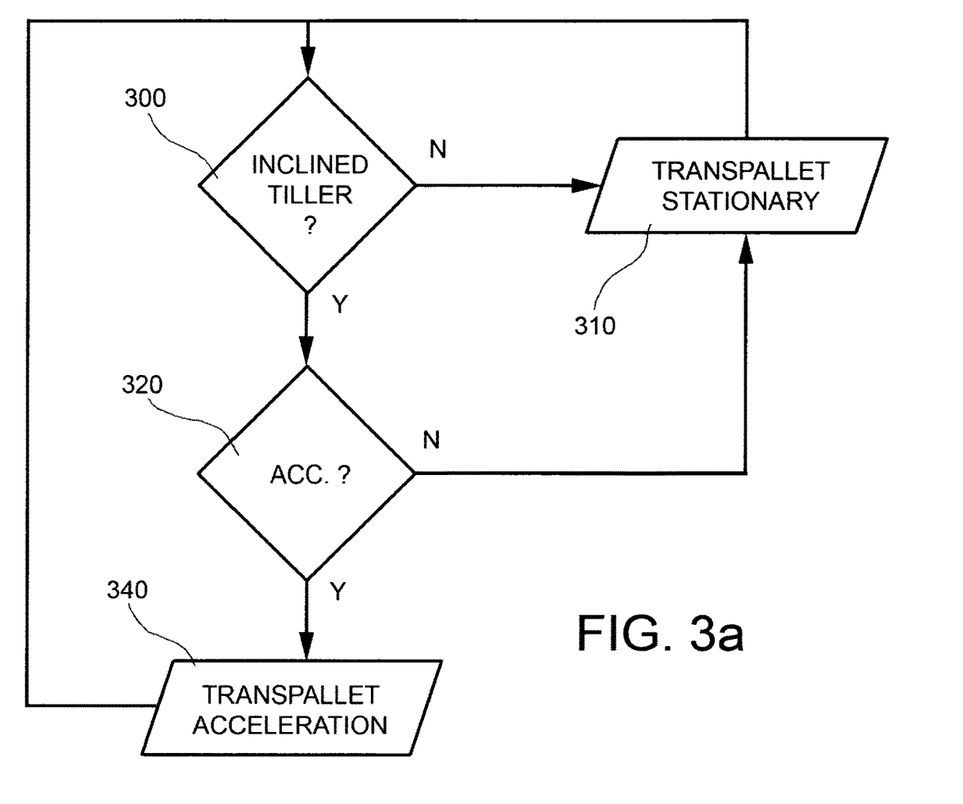
FIGS. 3a-3g are flowcharts representative of the motorized (electric) movement mode of the transpallet according to the present invention.

FIG. 3a refers to the condition for starting the drive of a transpallet in stand-by, whereby an operator has selected the motorized (electric) movement mode, i.e. after a starting operation as described in FIG. 2a or 2b.

The electronic control unit 60 checks at step 300 whether the driving tiller 22 is in the working position, i.e. in the inclined position corresponding to the transpallet translation control which is detected by the sensor means for detecting and quantifying the inclination of the driving tiller.

If the electronic control unit verifies that the tiller is not in an operating position, it maintains the exclusion of the energization of the parking braking system at step 310 so that the electromechanical parking braking system remain in the stop configuration of the transpallet. If the electronic control unit verifies that the driving tiller is in an operating position, it checks at step 320 whether the accelerator device is actuated by the operator. In the negative, the electronic control unit does not actuate any control, so the transpallet remains in the parking condition in which the electromechanical parking braking system is not energized. In the affirmative, the electronic control unit energizes the parking braking system (step 340) which therefore take on the release configuration, and the electric motors, whereby the transpallet translates accelerating up to a speed proportional to the control given through the accelerator device.

FIGS. 3b-3g refer to the condition of movement of a transpallet in stand-by, whereby an operator has selected the motorized (electric) movement mode.

Figure 3B:
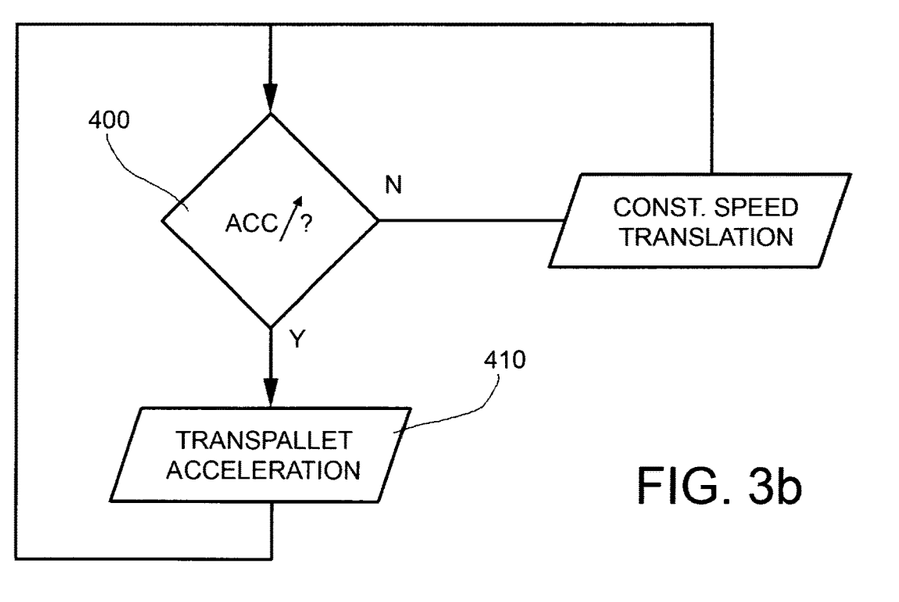

FIG. 3b refers to an acceleration operation of the transpallet. At step 400, the electronic control unit 60 checks whether the accelerator device is set to subsequently increasing values. In the affirmative, the electronic control unit varies the excitation of the electric motors of the wheels accordingly in step 410 and the transpallet accelerates. In the negative, the electronic control unit keeps the excitation of the electric motors of the wheels constant and the transpallet continues to move at constant speed.

Figure 3C:
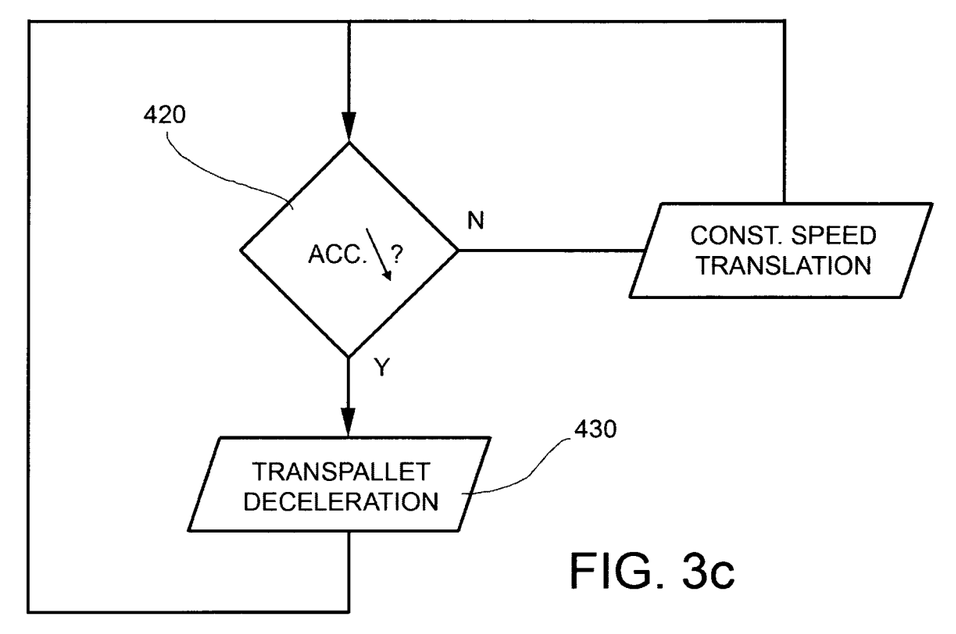

FIG. 3c refers to a deceleration operation of the transpallet. At step 420, the electronic control unit 60 checks whether the accelerator device is set to subsequently decreasing values. In the affirmative, the electronic control unit varies the excitation of the electric motors of the wheels accordingly in step 430 and the transpallet decelerates. In the negative, the electronic control unit keeps the excitation of the electric motors of the wheels constant and the transpallet continues to move at constant speed.

Figure 3D:
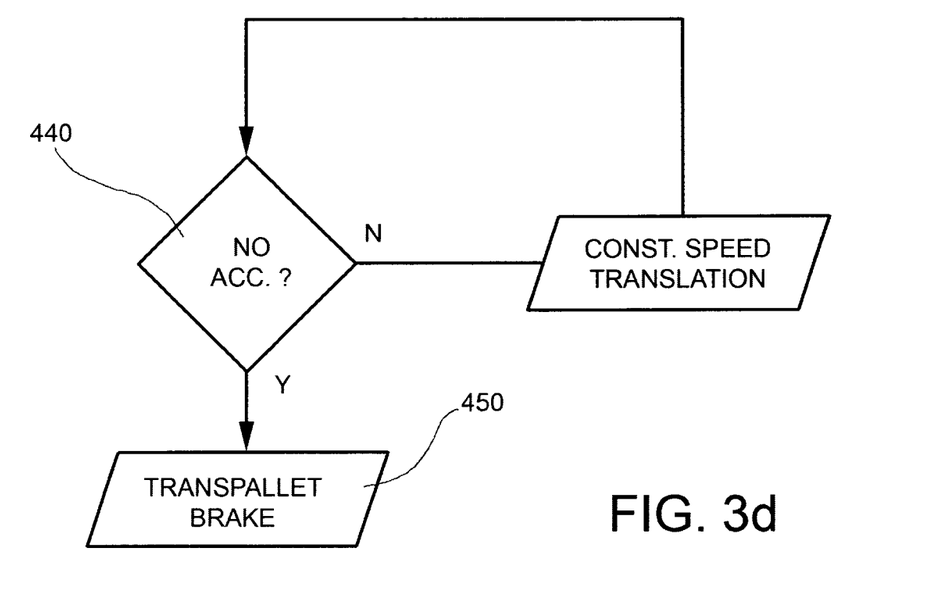

FIG. 3d refers to a service and braking stop operation of the transpallet. At step 440, the electronic control unit 60 checks whether the accelerator device is released or set to a null value. In the affirmative, the electronic control unit varies the excitation of the electric motors of the wheels accordingly at step 450 to brake the transpallet in countercurrent until it has completely stopped, when the energization of the parking braking system is automatically excluded. In the negative, the electronic control unit keeps the excitation of the electric motors of the wheels constant and the transpallet continues to move at constant speed.

Figure 3E:
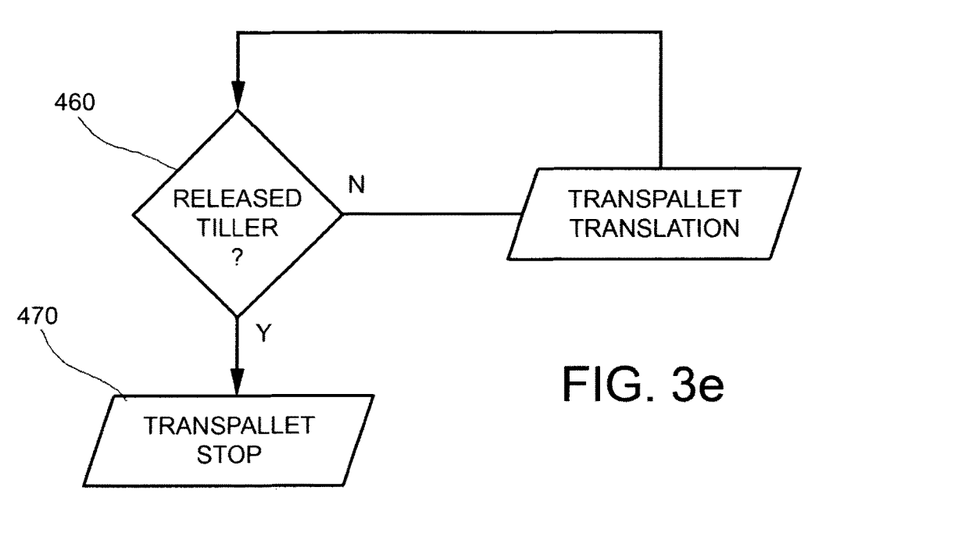

FIG. 3e refers to a manual stop operation of the transpallet. At step 460, the electronic control unit 60 checks whether the driving tiller is released and/or brought to a stop position. In the affirmative, the electronic control unit excludes the energization of the parking braking system whereby it causes the immediate stop of the transpallet at step 470. In the negative, the electronic control unit maintains the energization of the parking braking system and the excitation of the electric motors of the wheels in a manner corresponding to the command imparted by the accelerator device (as described with reference to FIGS. 3b and 3c) and the transpallet continues to translate.

Figure 3F:
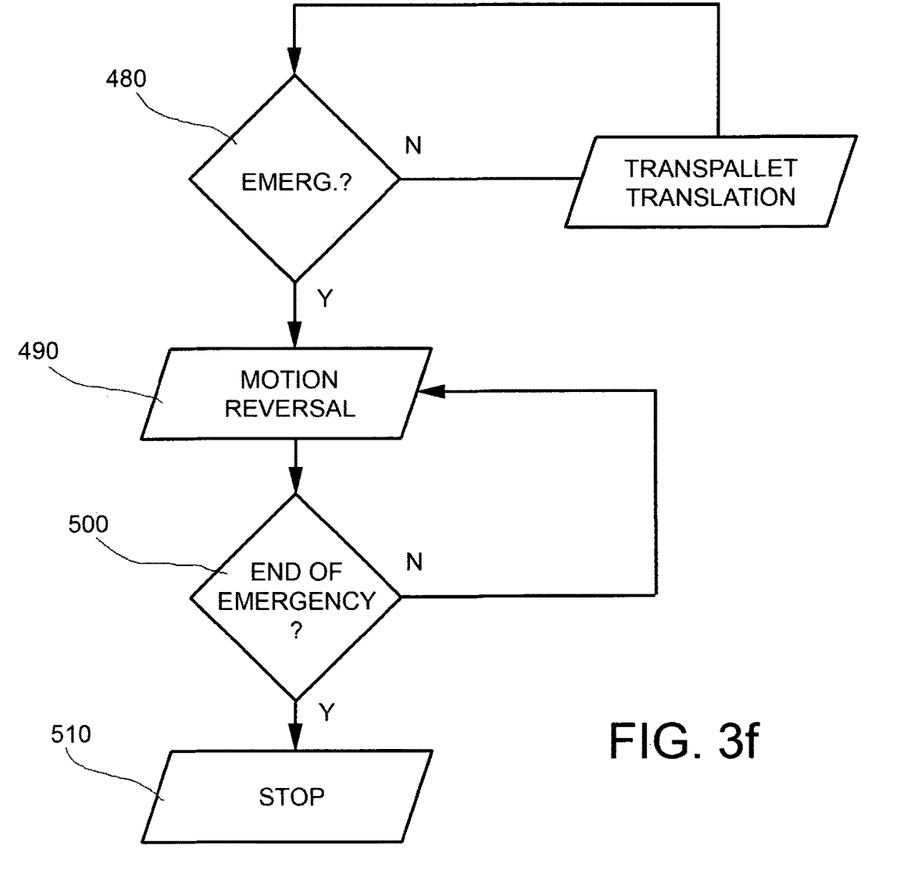

FIG. 3f refers to an emergency reverse operation of the transpallet. At step 480, the electronic control unit 60 checks whether the emergency stop system is activated. In the affirmative, the electronic control unit controls in step 490 the excitation of the electric motors of the wheels to reverse the current direction of motion when it knows or detects that this direction is directed towards the operator, activating an emergency handling mode of the transpallet. In the negative, the electronic control unit maintains the energization of the parking braking system and the excitation of the electric motors of the wheels in a manner corresponding to the control imparted by the accelerator device (as described with reference to FIGS. 3b and 3c) and the transpallet continues to translate.

If an emergency transpallet movement mode has been activated, at step 500 the electronic control unit checks whether the emergency stop system is deactivated, for example due to moving away the transpallet from the operator or another obstacle. In the affirmative, the electronic control unit controls the exclusion of the energization of the parking braking system, which causes the transpallet to stop at step 510, in the negative, the emergency movement mode of the transpallet of step 490 is maintained.

Figure 3G:
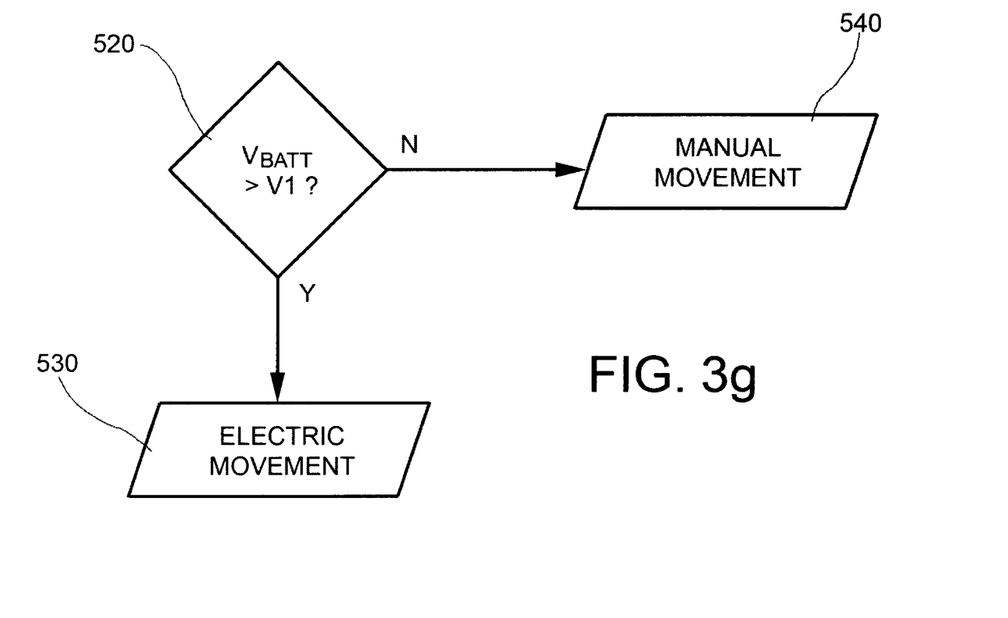

Finally, FIG. 3g refers to a switching operation of the transpallet. At step 520, the electronic control unit 60 continuously checks whether the battery charge level is higher than a first predetermined threshold level V1, similarly to what is described with reference to FIGS. 2a and 2b. In the affirmative, the electronic control unit maintains the motorized (electric) movement mode (step 530), in the negative, the electronic control unit carries out an emergency stop at step 540, excluding the energization of the parking braking system and prepares the manual movement mode of the transpallet.

Figure 4A:
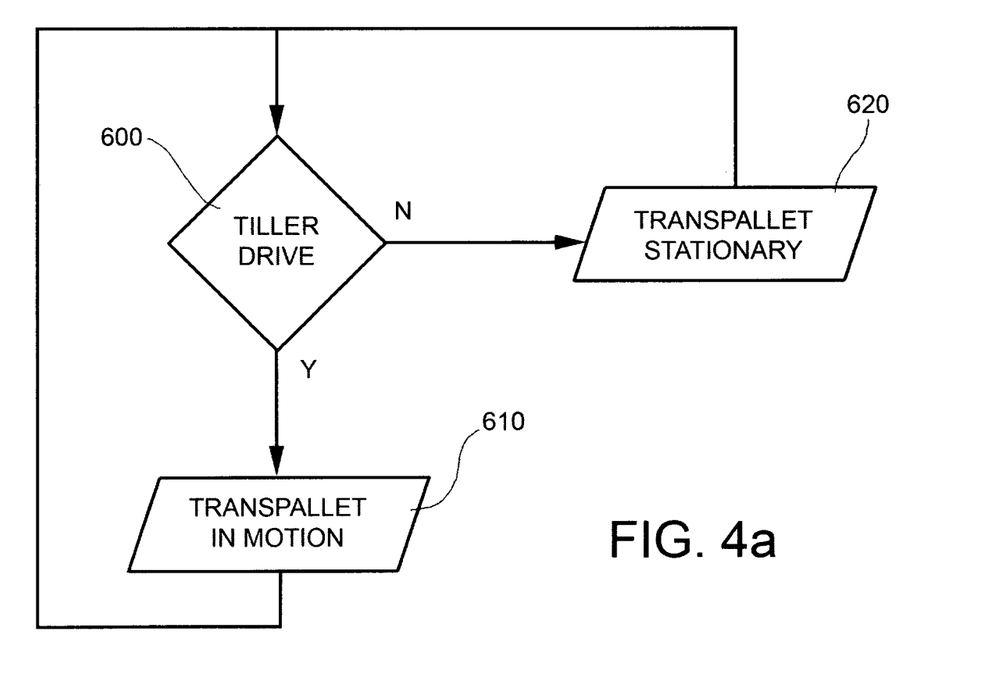
FIGS. 4a-4c are flowcharts representative of the manual movement mode of the transpallet according to the present invention.
Figure 4B:
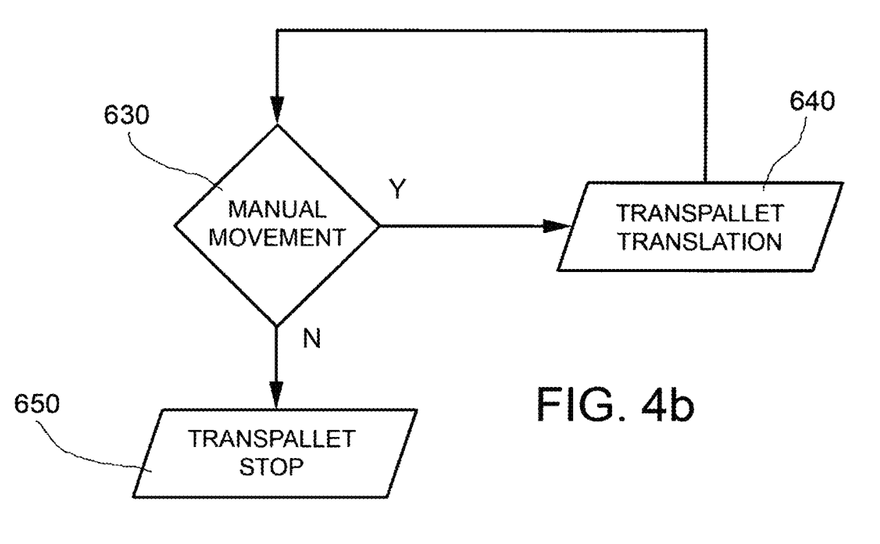
Figure 4C:
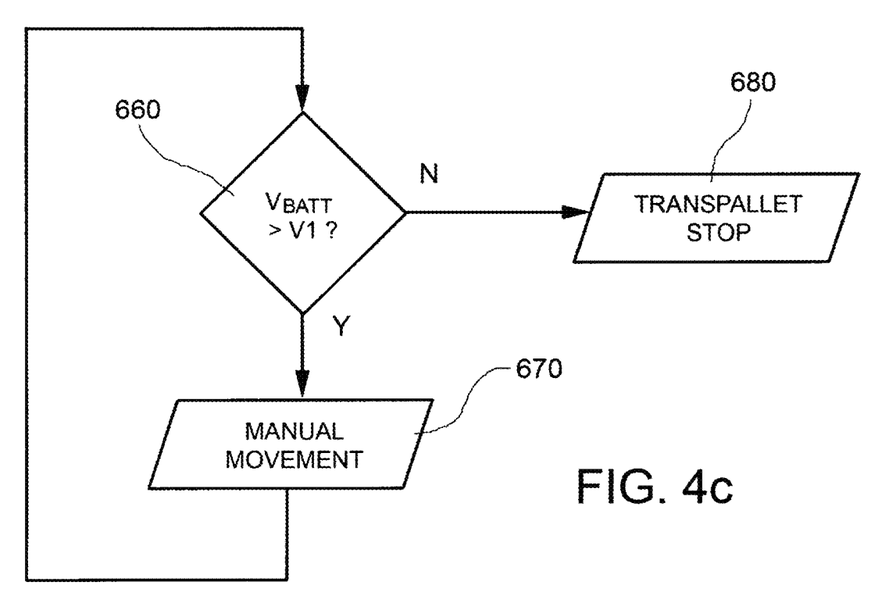

With reference to FIGS. 4a-4c, some embodiments of the transpallet in the manual movement mode are shown.

FIG. 4a refers to the condition for starting the drive of a transpallet in stand-by, whereby an operator has selected the manual movement mode, i.e. after a starting operation as described in FIG. 2b. The operation is similar to that carried out with a traditional manual transpallet. If the driving tiller 22 is pulled or pushed by the operator (600) (condition recognizable by the forward or backward inclination of the tiller), the transpallet moves proportionally to the operator's effort (610), otherwise it remains in a stop condition (620).

FIGS. 4b and 4c refer to embodiments of the transpallet in the manual movement mode selected by a dedicated switching device or a specific switching of the transpallet starting control in an exclusion position of the electric power supply. This selection can take place for the duration in which the switching device is actuated or for the duration between two successive actuations of the switching device.

FIG. 4b refers to a manual stop condition and/or switching to a locking state. At step 630, the electronic control unit 60 checks whether the selection of the manual movement mode is kept or not, for example by checking the position of the dedicated switching device or the transpallet starting means. If the electronic control unit checks that the selection of the manual movement mode is kept, it maintains the energization of the parking braking system (step 640) which therefore maintain the release configuration, whereby the transpallet can move at a speed which is a function of the force (thrust or traction) applied by the operator. If the electronic control unit checks that the selection of the manual movement mode is not kept, it excludes the energization of the parking braking system at the step 650 whereby the electromechanical parking braking system switch to the transpallet stop configuration.

Finally, FIG. 4c refers to an operation switching of the transpallet. At step 660, the electronic control unit 60 continuously checks whether the battery charge level is higher than a first predetermined threshold level V1, similarly to what is described with reference to FIG. 3g. In the affirmative, the electronic control unit maintains the manual movement mode (step 670), in the negative, the electronic control unit excludes the energization of the parking braking system at step 680 so that said parking braking system switch to the transpallet stop configuration.

In all cases of movement of the transpallet, the steering controls are imparted directly by rotating the driving tiller or by energizing the two motors differently.

The operations described above with reference to the flowcharts in FIGS. 3a-3g and FIGS. 4a-4c may be considered independently from each other, but it will be clear that each of them may be combined with one or more of the remainders in an integrated cycle or in distinct and successive moments according to programming methods within the reach of a man skilled in the art, and therefore not described herein.

The improvements described may be made to the transpallet as a whole or individually. It will in fact be apparent to a man skilled in the art that every single improvement pertaining to a specific component of the transpallet may be implemented independently of the others, and as such independently claimed, without the failure to implement the other illustrated improvements affecting the efficacy thereof.

Of course, the principle of the invention being understood, the manufacturing details and the embodiments may widely vary compared to what described and illustrated by way of a non-limiting example only, without departing from the scope of the invention as described and claimed herein.

What is claimed is:

1. A transpallet for ground handling of goods stored on a support platform, the transpallet comprising a support frame for a load, provided with a pair of front arms for gripping and lifting the support platform and a control assembly of the transpallet, including at least one wheel, a hydraulic or pneumatic drive unit, and a driving tiller coupled to the at least one wheel and the hydraulic or pneumatic drive unit, respectively, for directional maneuvering the transpallet and raising or lowering the support frame, wherein the at least one wheel is a motorized wheel; and
wherein the transpallet further comprises:
an electromechanical parking braking system, arranged to prevent or allow rotation of the at least one wheel, adapted to take on a stop configuration when not energized and a release configuration when energized;
an electric power supply assembly, adapted to supply electric power to the at least one motorized wheel and to the electromechanical parking braking system; and
an on board electronic control unit, arranged for selective handling of transpallet movement in a motorized mode of movement, a manual mode of movement, or a stop mode,
wherein the on board electronic control unit is arranged for:
checking whether a charge level of the electric power supply assembly is greater than a first predetermined threshold level, whereby, in the affirmative, the on board electronic control unit is arranged for providing electric power to the at least one motorized wheel and the electromechanical parking braking system for implementing the motorized mode of movement,
in case the charge level of the electric power supply assembly is lower than the first predetermined threshold level, checking whether the charge level of the electric power supply assembly is greater than a second predetermined threshold level lower than the first predetermined threshold level, whereby, in the affirmative, the on board electronic control unit is arranged to exclude electric power to the at least one motorized wheel and to provide electric power to the electromechanical parking braking system to implement the manual mode of movement, and
in case the charge level of the electric power supply assembly is lower than the second predetermined threshold level, excluding electrical power to the at least one motorized wheel and the electromechanical parking braking system for implementing the stop mode.

2. The transpallet of claim 1, wherein the on board electronic control unit is arranged to check whether the charge level of the electric power supply assembly is lower than a third predetermined threshold level, intermediate between the first predetermined threshold level and second predetermined threshold level, whereby, in the affirmative, the on board electronic control unit is arranged to provide a signal of a forthcoming exclusion of electric power to the electromechanical parking braking system within a predetermined time interval.

3. The transpallet of claim 1, comprising selecting an operating mode operable by an operator, wherein the on board electronic control unit is arranged to exclude electrical power to the at least one motorized wheel and to the electromechanical parking braking system if the charge level of the electric power supply assembly is lower than the first predetermined threshold level and greater than the second predetermined threshold level, and if the on board electronic control unit has not detected a setting of the manual mode of movement.

4. The transpallet of claim 1, comprising a pair of motorized wheels, each motorized wheel including a synchronous electric motor and a gearbox housed inside the wheel.

5. The transpallet of claim 1, comprising starting devices for electric connection of the electric power supply assembly to the at least one motorized wheel and the electromechanical parking braking system.

6. The transpallet of claim 1, comprising an accelerator device, adapted to transmit a transpallet acceleration or deceleration signal to the on board electronic control unit, arranged to provide a corresponding electric power to the at least one motorized wheel.

7. The transpallet of claim 6, wherein the on board electronic control unit is arranged to adjust a travel speed of the transpallet as a function of the acceleration or deceleration signal transmitted by the accelerator device and to control a counter-current electric braking up to stop the transpallet when the acceleration or deceleration signal fails.

8. The transpallet of claim 1, comprising or more sensors for detecting a driving tiller inclination relative to a predetermined reference direction, adapted to transmit a drive approval signal to the on board electronic control unit arranged to provide a corresponding electrical power to the electromechanical parking braking system.

9. The transpallet of claim 8, wherein the electronic control unit is arranged to:
not energize the electromechanical parking braking system so as to cause a stop configuration of the at least one wheel for a first angular threshold position of a driving tiller between a rest position and a first operational angular threshold position;
energize the electromechanical parking braking system so as to determine switching from the stop configuration of the at least one wheel to a release configuration of the at least one wheel for a second angular threshold position of the driving tiller comprised between the first operational angular threshold position and a second operational angular threshold position; and
not energize the electromechanical parking braking system so as to determine the switching from the release configuration of the at least one wheel to the stop configuration of the at least one wheel for a third angular threshold position of the driving tiller between the second operational angular threshold position and an end-of-stroke angular position.

10. The transpallet of claim 1, comprising emergency stop system, adapted to transmit a signal of inverting the current direction of travel of the transpallet to the on board electronic control unit arranged to provide a corresponding electric power to the at least one motorized wheel.

* * * * *